US009679183B2

(12) United States Patent
Minteer et al.

(10) Patent No.: US 9,679,183 B2
(45) Date of Patent: Jun. 13, 2017

(54) FINGER BIOMETRIC SENSOR INCLUDING DRIVE SIGNAL LEVEL UPDATING AND RELATED METHODS

(71) Applicant: APPLE INC., Cupertino, CA (US)

(72) Inventors: Gregory T. Minteer, Cupertino, CA (US); Dale R. Setlak, Cupertino, CA (US); Albert M. Straub, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 695 days.

(21) Appl. No.: 14/135,783

(22) Filed: Dec. 20, 2013

(65) Prior Publication Data

US 2015/0178542 A1     Jun. 25, 2015

(51) Int. Cl.
     G06K 9/00          (2006.01)

(52) U.S. Cl.
     CPC ................................ *G06K 9/0002* (2013.01)

(58) Field of Classification Search
     CPC ............ G06K 9/0002; G06K 9/00013; G06K 9/00577; G06K 2009/00583
     See application file for complete search history.

(56) References Cited

U.S. PATENT DOCUMENTS

| 5,940,526 | A | 8/1999 | Setlak et al. | |
|---|---|---|---|---|
| 5,963,679 | A | 10/1999 | Setlak | |
| 2007/0019844 | A1* | 1/2007 | Yumoto | G06K 9/00087 382/124 |
| 2007/0294540 | A1* | 12/2007 | Wadayama | G06Q 20/341 713/186 |
| 2012/0250949 | A1* | 10/2012 | Abiko | G06T 1/00 382/115 |
| 2013/0177220 | A1* | 7/2013 | Erhart | G06K 9/0002 382/124 |
| 2013/0265137 | A1* | 10/2013 | Nelson | G06K 9/0002 340/5.82 |
| 2014/0016838 | A1* | 1/2014 | Dean | G06K 9/0002 382/124 |

* cited by examiner

*Primary Examiner* — Abbas Abdulselam
(74) *Attorney, Agent, or Firm* — Allen, Dyer, Doppelt & Gilchrist, P.A.

(57) ABSTRACT

A finger biometric sensor may include an array of finger biometric sensing pixels and processing circuitry coupled thereto. The processing circuitry may be capable of acquiring initial data from the array based upon an initial drive signal level and with a finger positioned adjacent the array, and determining an updated drive signal level based upon the initial data. The processing circuitry may also be capable of acquiring finger biometric data from the array of finger biometric sensing pixels based upon the updated drive signal level and with the finger positioned adjacent the array.

21 Claims, 6 Drawing Sheets

FINGER BIOMETRIC SENSOR INCLUDING DRIVE SIGNAL LEVEL UPDATING AND RELATED METHODS

FIELD OF THE INVENTION

The present invention relates to the field of electronics, and, more particularly, to electronic devices including finger biometric sensors and related methods.

BACKGROUND

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,963,679 to Setlak and assigned to the assignee of the present invention. The fingerprint sensor is an integrated circuit sensor that drives the user's finger with an electric field signal and senses the electric field with an array of electric field sensing pixels on the integrated circuit substrate. Such sensors are used to control access for many different types of electronic devices such as computers, cell phones, personal digital assistants (PDA's), and the like. In particular, fingerprint sensors are used because they may have a small footprint, are relatively easy for a user to use and they provide reasonable authentication capabilities.

In some recent applications, the sensor may desirably capture images of fingerprint patterns from fingers that are farther away from the sensor array than is typical with today's technologies. Unfortunately, as the finger gets farther away from the sensor array (for example when a relatively thick dielectric lies between the sensor array and the finger), the spatial field strength variations that represent the fingerprint pattern become weaker. One way to compensate for this loss of spatial pattern strength is to increase the voltage of the signals that generate the field between the finger and the sensor array, also known as the drive signal. The fingerprint spatial pattern strength increases proportionately.

However, the detected signals generated from the sensor array and based upon placement of the user's finger adjacent the sensor array are relatively small compared to the drive signal. Thus, these relatively small detected signals may be increasingly difficult to process along with the relatively high drive signal, limiting measurement resolution of the detected signals, for example. Amplifier and processing stages that read and process the detected signals may add additional noise. Another source of noise may be fixed pattern noise from the sensor array, which also may make it increasingly difficult to measure the detected signals.

SUMMARY

A finger biometric sensor may include an array of finger biometric sensing pixels and processing circuitry coupled to the array. The processing circuitry may be capable of acquiring initial data from the array based upon an initial drive signal level and with a finger positioned adjacent the array, and determining an updated drive signal level based upon the initial data. The processing circuitry may also be capable of acquiring finger biometric data from the array based upon the updated drive signal level and with the finger positioned adjacent the array.

The finger biometric sensor may further include a finger coupling electrode adjacent the array of finger biometric sensing pixels. The processing circuitry may further include drive circuitry coupled to the finger coupling electrode. The drive circuitry may be capable of generating a range of drive signal levels. The initial drive signal level may be at a maximum of the range of drive signal levels, for example.

The processing circuitry may be capable of determining whether the finger is stable. The processing circuitry may be capable of determining the updated drive signal level when the finger is stable, for example.

The processing circuitry may include a digital-to-analog converter (DAC) and at least one gain stage coupled thereto. The processing circuitry may be capable of acquiring the initial data from a plurality of spaced-apart sub-arrays of the array of finger biometric sensing pixels. The plurality of spaced apart sub-arrays may be are arranged in a checkerboard pattern, for example. The array of finger biometric sensing pixels may include an array of electric field finger sensing pixels.

An electronic device aspect may include a housing and wireless communications circuitry carried by the housing. The finger biometric sensor may be carried by the housing.

A method aspect is directed to a method of acquiring finger biometric data. The method includes acquiring initial data from an array based upon an initial drive signal level and with a finger positioned adjacent the array of finger biometric sensing pixels. The method also includes determining an updated drive signal level based upon the initial data, and acquiring the finger biometric data from the array based upon the updated drive signal level and with the finger positioned adjacent the array.

DETAILED DESCRIPTION

The present embodiments will now be described more fully hereinafter with reference to the accompanying drawings, in which preferred embodiments of the invention are shown. These embodiments may, however, take many different forms and should not be construed as limited to those set forth herein. Rather, these embodiments are provided so that this disclosure will be thorough and complete, and will fully convey the scope of the disclosure to those skilled in the art. Like numbers refer to like elements throughout, and prime notation is used to indicate similar elements in alternative embodiments.

Figure 1:
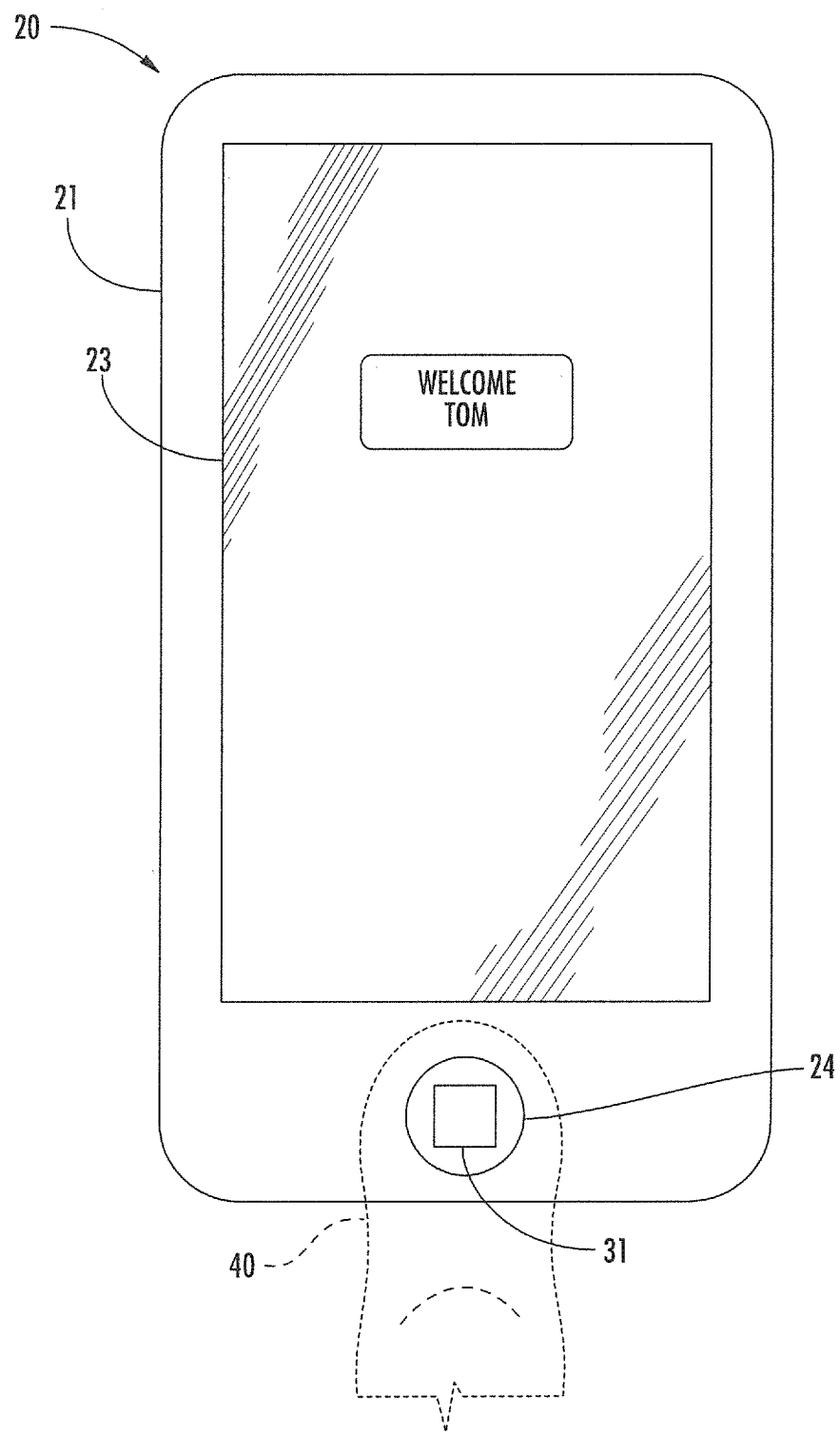
FIG. 1 is a plan view of an electronic device according to an embodiment.
Figure 2:
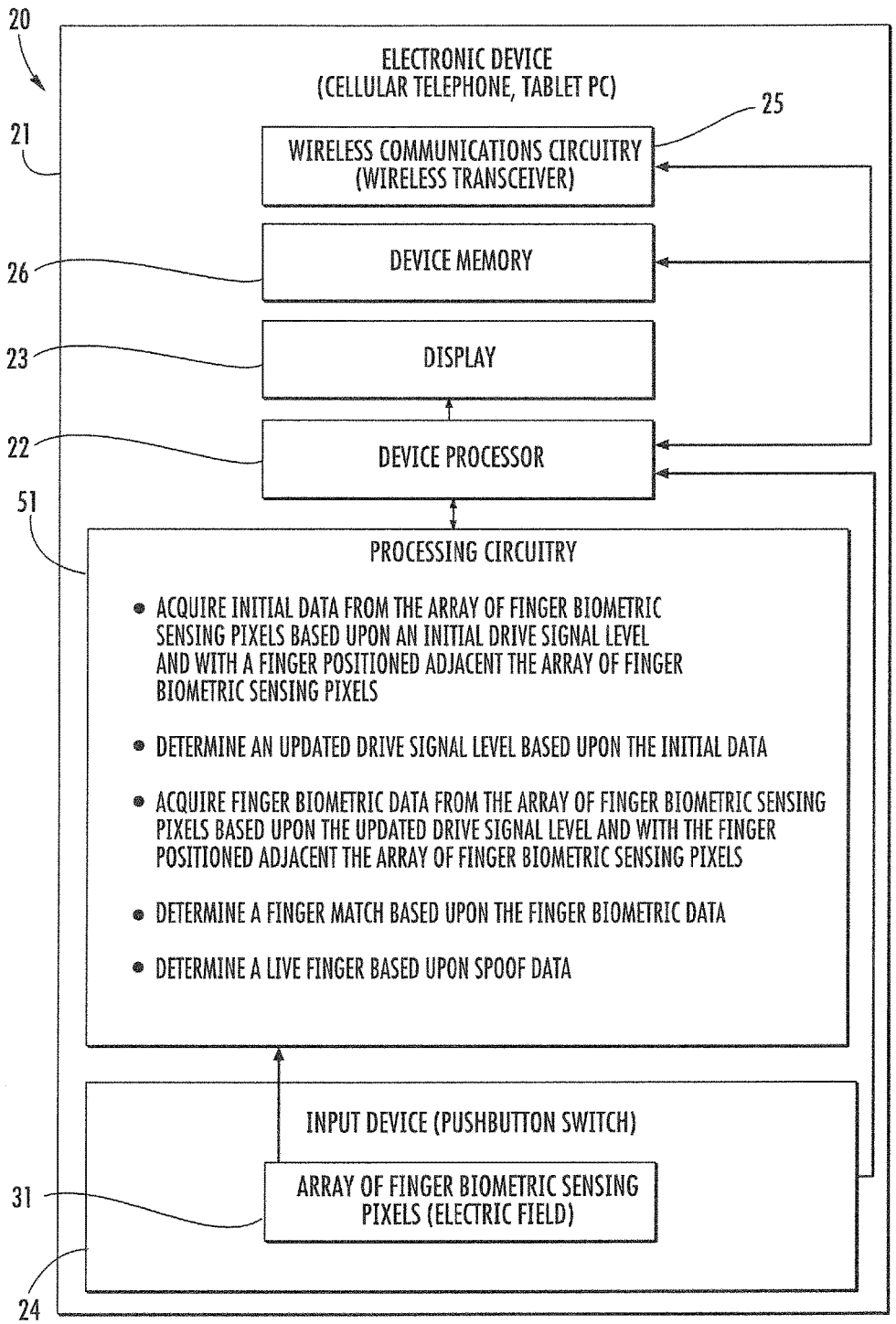
FIG. 2 is a schematic block diagram of the electronic device of FIG. 1.

Referring initially to FIGS. 1-2, an electronic device 20 is now described. The electronic device 20 illustratively includes a portable housing 21 and a device processor 22 carried by the portable housing. The electronic device 20 is illustratively a mobile wireless communications device, for example, a cellular telephone. The electronic device 20 may be another type of electronic device, for example, a tablet computer, laptop computer, etc.

Wireless communications circuitry 25 (e.g. a wireless transceiver, cellular, WLAN Bluetooth, etc.) is also carried within the housing 21 and coupled to the device processor 22. The wireless transceiver 25 cooperates with the device processor 22 to perform at least one wireless communications function, for example, voice and/or data communication. In some embodiments, the electronic device 20 may not include a wireless transceiver 25.

A display 23 is also carried by the portable housing 21 and is coupled to the device processor 22. The display 23 may be a liquid crystal display (LCD), for example, or may be another type of display, as will be appreciated by those skilled in the art. A device memory 26 is also coupled to the processor 22.

A finger-operated user input device, illustratively in the form of a pushbutton switch 24, is also carried by the portable housing 21 and is coupled to the device processor 22. The pushbutton switch 24 cooperates with the device processor 22 to perform a device function in response to manipulation of the pushbutton switch. For example, a device function may include a powering on or off of the electronic device 20, initiating communication via the wireless communications circuitry 25, and/or performing a menu function.

More particularly, with respect to a menu function, the device processor 22 may change the display 23 to show a menu of available applications based upon pressing of the pushbutton switch 24. In other words, the pushbutton switch 24 may be a home switch or button, or key. Of course, other device functions may be performed based upon the pushbutton switch 24. In some embodiments, the finger-operated user input device 24 may be a different type of finger-operated user input device, for example, forming part of a touch screen display. Other or additional finger-operated user input devices may be carried by the portable housing 21.

The electronic device 20 includes a finger biometric sensor 50, which may be in the form of one or more integrated circuits (ICs). The finger biometric sensor 50 includes an array of finger biometric sensing pixels 31 that may be part of an IC carried by the pushbutton switch 24 to sense a user's finger 40 or an object placed adjacent the array of electric field sensing pixels. Each pixel of the array of finger biometric sensing pixels 31 may be an electric field sensing pixel of the type as disclosed in U.S. Pat. No. 5,940,526 to Setlak et al., for example, assigned to the present assignee, and the entire contents of which are incorporated herein by reference.

The finger biometric sensor 50 includes processing circuitry 51 which may be in the form of one or more processors and a memory coupled thereto. Other circuitry may be included in the processing circuitry 51, as will be described in further detail below.

Figure 3:
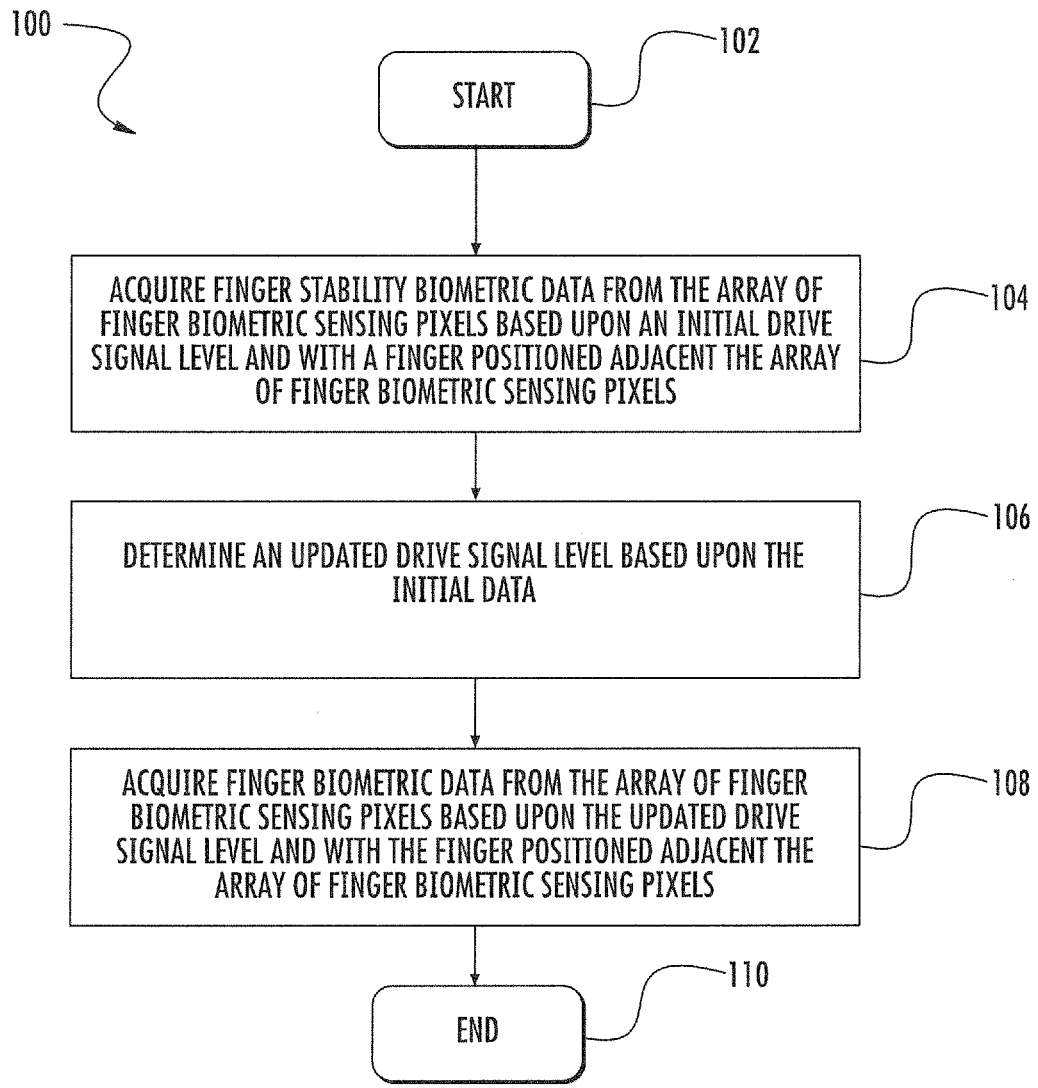
FIG. 3 is a flowchart of acquisition of finger biometric data from the finger sensor of FIG. 2.

Referring now to the flowchart 100 in FIG. 3, beginning at Block 102, acquisition of finger biometric data from the finger biometric sensor 50 is now described. The processing circuitry 51, at Block 104 acquires initial data from the array of finger biometric sensing pixels 31 based upon an initial drive signal level and with a finger 40 positioned adjacent the array of finger biometric sensing pixels.

The processing circuitry 51 determines an updated drive signal level based upon the initial data (Block 106). The processing circuitry 51, at Block 108, acquires finger biometric data from the array of finger biometric sensing pixels 31 based upon the updated drive signal level and with the finger 40 positioned adjacent the array of finger biometric sensing pixels before ending at Block 110.

In some embodiments, the processing circuitry 51, for example, may also cooperate with the array of finger biometric sensing pixels 31 to determine a finger match based upon the image data. More particularly, the processing circuitry 51 may determine a finger match based upon enrollment image data stored in memory and a sufficient amount of generated image data. Enrollment data may typically be collected over a series of regions of a finger that are then assembled or composited into a larger region. The match or generated image data may be smaller, but still having an area or number of matching features to provide a desired rate of matching.

In some embodiments, the processing circuitry 51 may also determine a live finger based upon spoof data. More particularly, the processor 51 may determine a live finger based upon a complex impedance and/or bulk impedance measurement.

In some embodiments, the processing circuitry 51 may cooperate with the array finger biometric sensing pixels 31 to perform a navigation function, for example. Of course the processing circuitry 51 may cooperate with the array finger biometric sensing pixels 31 and/or other circuitry to perform other or additional functions, as will be appreciated by those skilled in the art.

It should be understood that in some embodiments, the processing circuitry 51 may be part of or included in the device processor 22. In other words, the functionality described herein with respect to the processing circuitry 51 may be performed by the device processor 22, another processor, or shared between or among processors.

Figure 4:
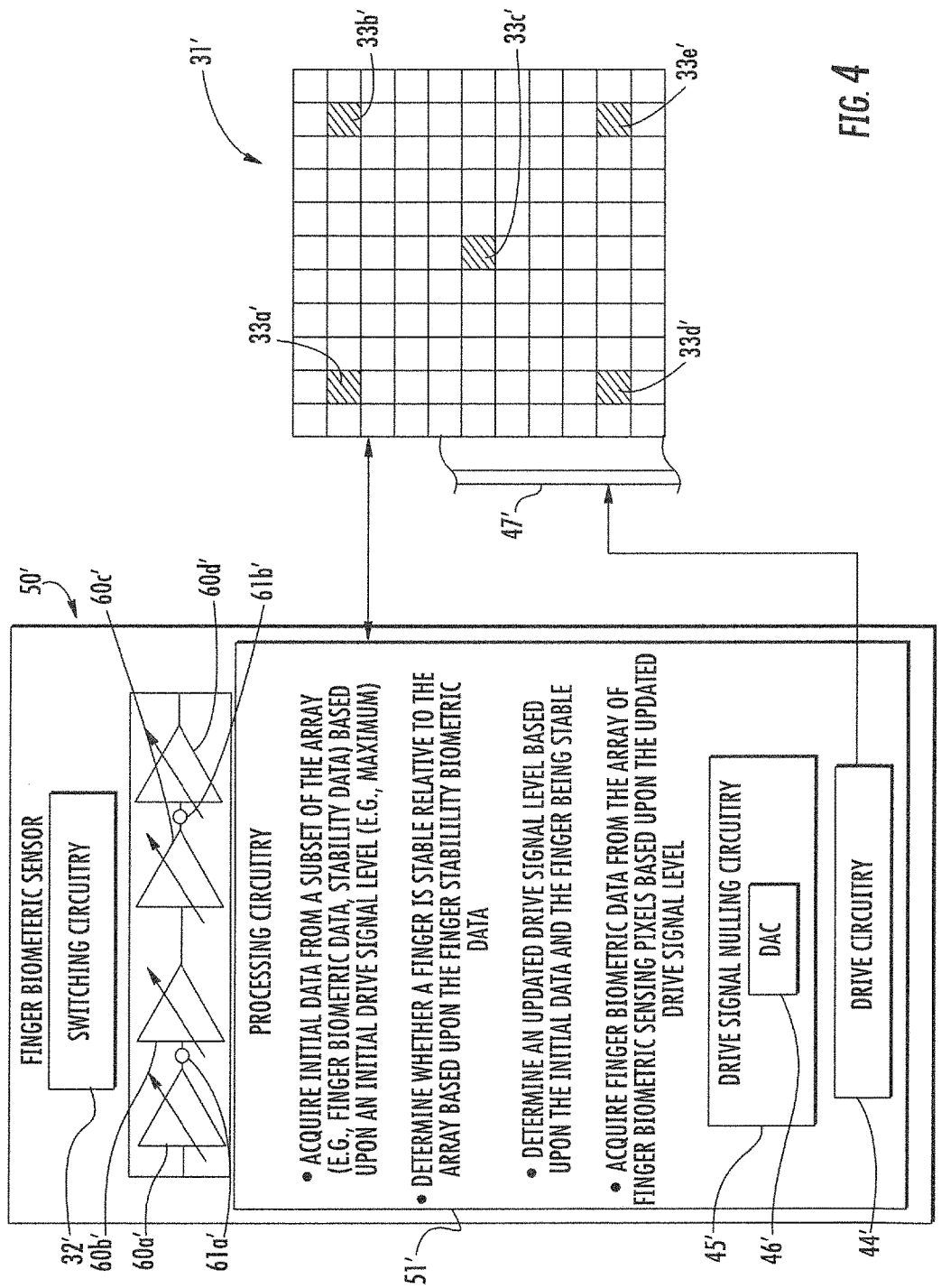
FIG. 4 is a schematic block diagram of a portion of finger biometric sensor according to another embodiment.
Figure 5:
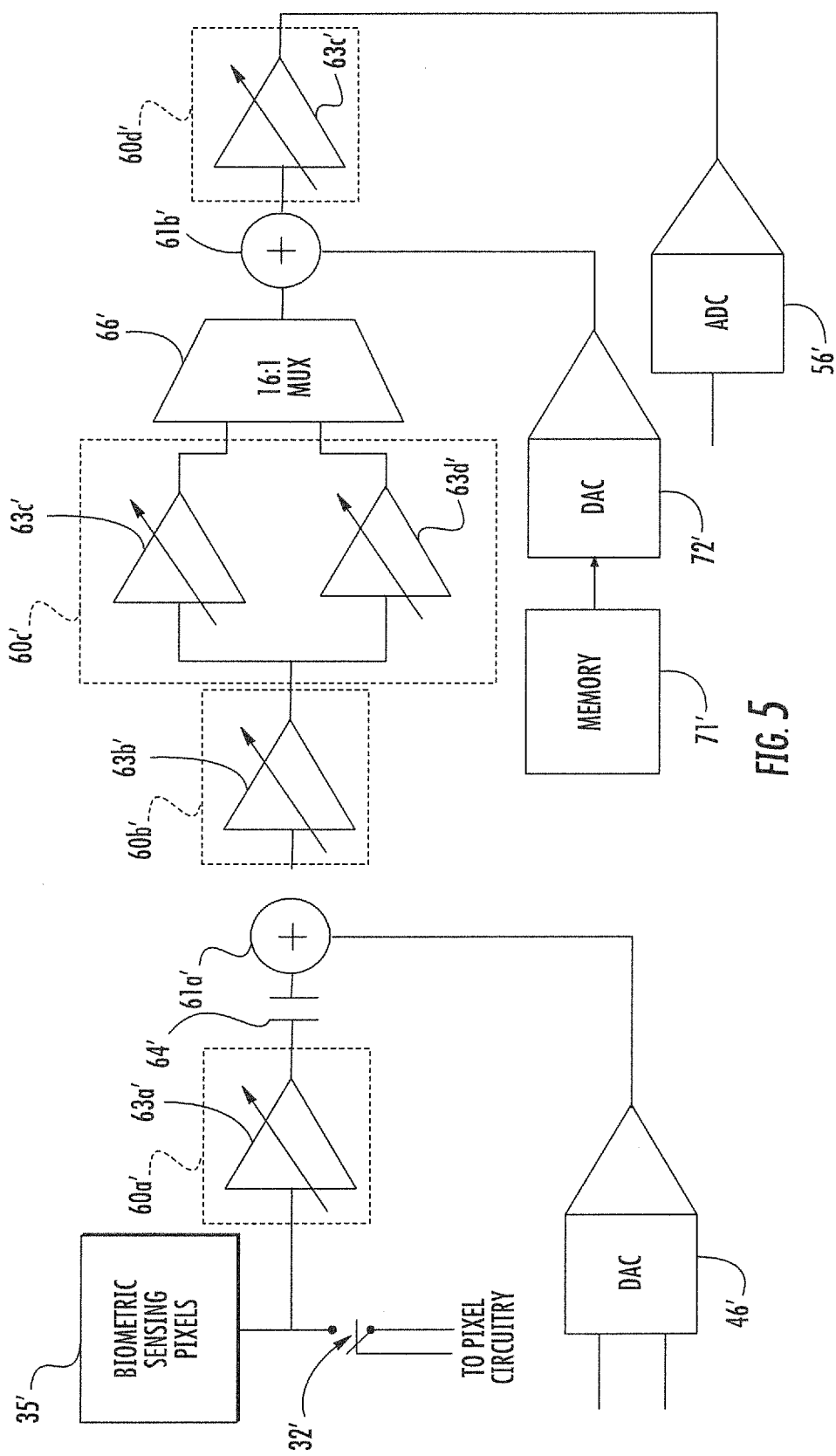
FIG. 5 is a more detailed schematic diagram of the portion of the finger biometric sensor of FIG. 4.

Referring now to FIGS. 4 and 5, further details of a finger biometric sensor 50' are described. The finger biometric sensor 50' also includes switching circuitry 32' coupled to the array of finger biometric sensing pixels 31' and gain stages 60$a$'-60$d$'. The switching circuitry 32' is capable of acquiring finger biometric data from each of a plurality of sub-arrays 33$a$'-33$e$' of the array of finger biometric sensing pixels 31'. More particularly, the switching circuitry 32' is capable of sequentially generating output data for adjacent regions of the array of finger biometric sensing pixels 31' or sub-arrays 33$a$'-33$e$', or more particularly, for each finger biometric sensing pixel 35'. In an 88×88 array of finger biometric sensing pixels, there are 7744 finger biometric sensing pixels and 7744 corresponding switches. Of course, additional switches may be used, as will be appreciated by those skilled in the art.

The finger biometric sensing device 50', and more particularly, the processing circuitry 51' includes drive circuitry 44' capable of generating a drive signal coupled to the array of finger biometric sensing pixels 31'. The array of finger biometric sensing pixels 31' cooperates with the drive circuitry 44' to generate a drive signal or detected signal based upon placement of a finger 40' adjacent the array of finger biometric sensing pixels. The gain stages 60$a$'-60$d$' are coupled together in series and define summing nodes 61$a$'-61$b$' between each pair of adjacent gain stages.

The first gain stage 60$a$' may be in the form of one or more variable gain amplifiers 63$a$' defining front end amplifiers, each respectively coupled to a finger biometric sensing pixel from the array of finger biometric sensing pixels 31'. The first gain stage 60a' is input with the detected signal at a raw signal level. An output of the first gain stage 60a' is coupled to the first summing node 61a'. For an 8-channel implementation (e.g., for an 88×88 array of finger biometric sensing pixels divided into eleven 8×8 regions), there are 8 instances of the illustrated first gain stage 60e.

The second gain stage 60b' may also be in the form of one or more variable gain amplifiers 63b' defining AC amplifiers. Each amplifier 63b' of the second gain stage 60b' has an input coupled to the first summing node 61a'. A capacitor 64' or other impedance device may be coupled between the first summing node 61a' and the first gain stage 60a'. The second gain stage 60b' also processes the input signal at a raw signal level. For an 8-channel implementation (e.g., for an 88×88 array of finger biometric sensing pixels divided into eleven 8×88 regions), there are 8 instances of the illustrated second gain stage 60b'.

The third gain stage 60c' may be in the form of one or more pairs of variable gain amplifiers 63c', 63d' defining a correlated double sampler (CDS). More particularly, the third gain stage 60c' may include odd and even variable gain amplifiers 63c', 63d' for each channel. For an 8-channel implementation, there are 8 instances of the illustrated third gain stage 60c'. The output of each of the odd and even variable gain amplifiers 63c', 63d' of the third gain stage 60c' are input to a multiplexer 66'. As will be appreciated by those skilled in the art, the multiplexer 66' may be a 16:1 multiplexer for an 8 channel implementation. The output of the multiplexer 66 is summed, at the second summing node 61b', with an output from a second digital-to-analog converter (DAC) 72', which will be described in further detail below. The third gain stage 60c' also processes the input signal at a raw signal level.

The fourth gain stage 60d' may also be in the form of one or more variable gain amplifiers 63e'. The variable gain amplifier 63e' may have an input coupled to the second summing node 61b' and an output coupled to the third summing node 61c'. The fourth gain stage 60d' processes the input signal at a feature signal level. Of course, while four gain stages 60a'-60d' are illustrated and described, there may be additional gain stages.

The finger biometric sensor 50' includes a finger coupling electrode 47' adjacent the array of finger biometric sensing pixels 31'. The drive circuitry 44' may be in form of a drive signal generator, or voltage generator, coupled to the finger coupling electrode 47'.

The array of finger biometric sensing pixels 31' and the gain stages 60a'-60d' have a circuit reference associated therewith. The circuit reference is to be coupled to a device ground so that the drive circuitry 44' drives the finger coupling electrode 47' with respect to the circuit reference and the device ground.

The finger biometric sensor 50' also includes drive signal nulling circuitry 45' coupled to the gain stages 60a'-60d'. As will be appreciated by those skilled in the art, relatively high voltage drive signals may result in relatively large common mode voltages appearing on the detected signal generated from the array of finger biometric sensing pixels 31'. Since the drive signal generally carries no useful information, it may be particularly desirable to reduce or eliminate it as early as possible in the signal chain. Specifically, small spatial variations in electric field intensity in the presence of a relatively large average field intensity may be measured.

The drive signal nulling circuitry 45' is capable of reducing the relatively large drive signal component from the detected signal. The drive signal nulling circuitry 45' includes digital-to-analog converter (DAC) 46' capable of generating an inverted scaled replica of the drive signal for the gain stages 60a'-60d'. More particularly, the DAC 46' is coupled to the first summing node 61a'. A memory may be coupled to the DAC 46'.

An output analog-to-digital converter (ADC) 56' may be coupled downstream from the gain stages 60a'-60d'. More particularly, the output ADC 56' may be coupled to the fourth gain stage 60d' and may have a dynamic range. In some embodiments, a memory may be coupled to the ADC 56'. Control circuitry is capable of adjusting the fourth gain stage 60d', and in some embodiments, other and/or additional gain stages so that an output thereof is within the dynamic range of output ADC 57'.

Figure 6:
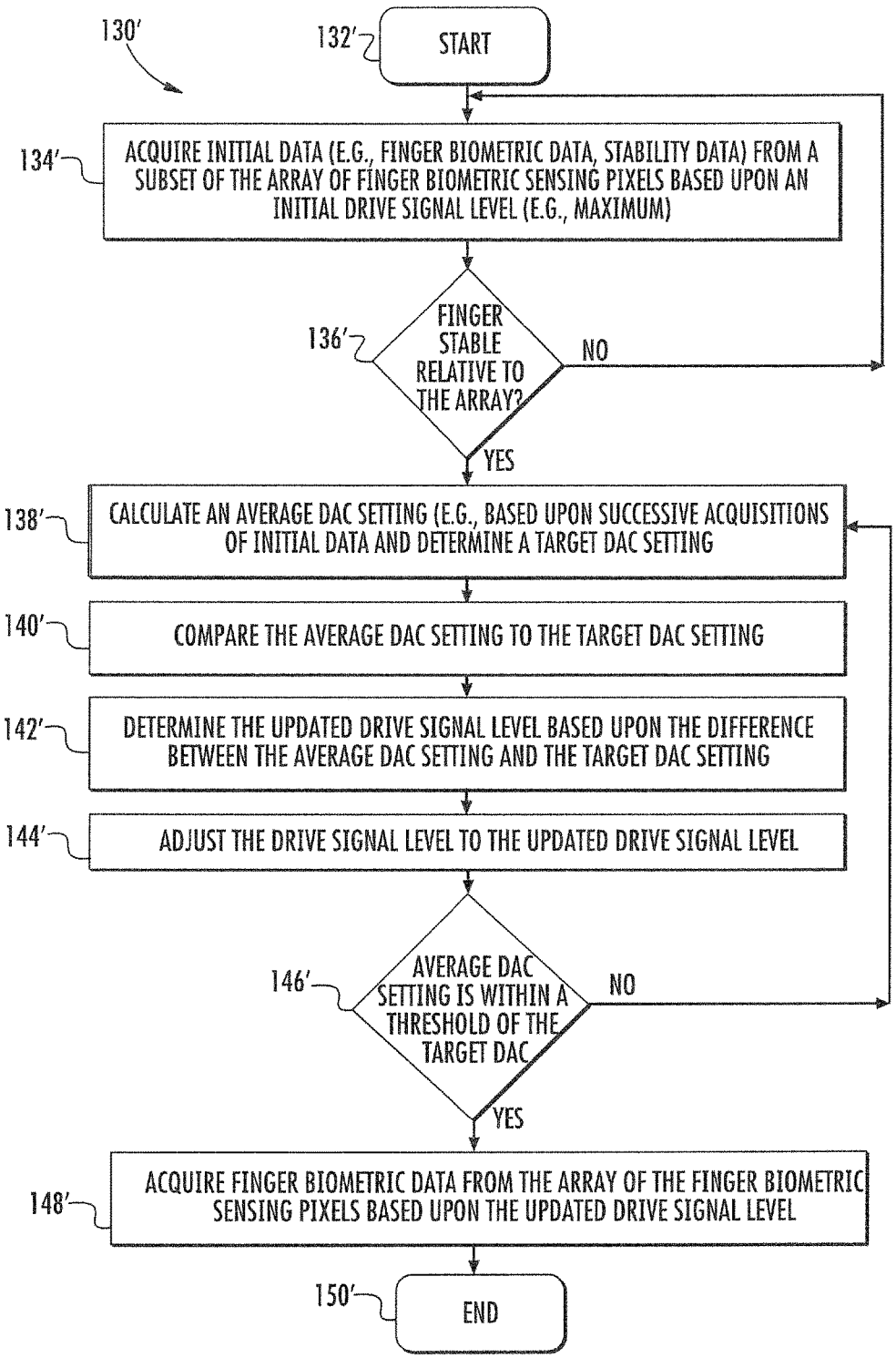
FIG. 6 is a flowchart of acquisition of finger biometric data from the finger sensors of FIG. 4.

Referring now additionally to the flowchart 130' in FIG. 6, beginning at Block 132', further details of the finger biometric 50' sensor and acquisition of finger biometric data from the finger biometric sensor are now described. At Block 134', the processing circuitry 51' acquires initial data from a subset of the array of finger biometric sensing pixels 31' based upon an initial drive signal level. More particularly, the drive circuitry 44', which generates a range of drive signal levels, generates the initial drive signal level to be at a maximum of the range of drive signal levels. The initial data may include finger stability biometric data, impedance data, and ridge/flow data, for example. Of course, other and/or additional types of data may form the initial data, and the initial data may not be limited to finger data.

At Block 136', the processing circuitry 51' determines whether a finger is stable relative to the array of finger biometric sensing pixels 31' based upon the initial data, and more particularly, finger stability biometric data. Determining whether a finger is stable may include checking for stability and motion. The processing circuitry 51' acquires finger stability biometric data from a subset of the array of finger biometric sensing pixels 31'. As illustrated in FIG. 4, the subset of the array of finger biometric sensing pixels 30' includes spaced apart sub-arrays 33a'-33e' from five regions of finger biometric sensing pixels and arranged in a checkerboard pattern. Each sub-array 33a'-33e' may include an 8×8 arrangement of pixels. In some embodiments, the subset may include sub-arrays configured or arranged in other patterns and from other regions. Moreover, while five sub-arrays from five regions of finger biometric finger sensing pixels are illustrated, the subset may include any number of sub-arrays and regions.

In the illustrated embodiment, the processing circuitry 51' acquires finger stability data from each of the sub-arrays to determine whether there is a finger in the region. A region may be considered to include sub-arrays from a given column of the array of finger biometric sensing pixels 31'. Of course, in other embodiments, a region may be defined by, for example, a row of sub-arrays.

In some embodiments, prior to determining whether the finger is stable, the processing circuitry 51' may determine whether a threshold number of sub-arrays is sensing the finger. More particularly, the processing circuitry 51' may determine whether sub-arrays from at least three regions (of the five) have acquired finger stability data indicative of a finger. A setting of the DAC 46' may be indicative of whether a finger is in a given region. If less than three regions have acquired finger stability data indicative of a finger, then the processing circuitry 51' again acquires initial data, for example, finger stability biometric data from the subset of the array of finger biometric sensing pixels 31'. The threshold number of sub-arrays may be any number, and, for example, may be based upon the total number of sub-arrays.

Once the processing circuitry 51' has determined that a threshold number of sub-arrays is sensing a finger, the processing circuitry determines whether a finger is stable relative to the array of finger biometric sensing pixels 31' based upon the finger stability biometric data (Block 136'). More particularly, the processing circuitry 51' determines whether the finger is stable based upon whether the threshold number of sub-arrays indicates stability over successive data acquisitions. A determination of stability may be made when a difference between a last setting and current setting of the DAC 46' are either less than a first threshold or greater than a second threshold that is greater than the first threshold. A determination of stability may also be made based upon a difference between the difference between the last setting and the current setting of the DAC 46', and the last setting being less than a threshold, for example, 0 (i.e, (current−last)−(last−previousTolast)<threshold, or (N−(N−1))−((N−1)−(N−2), etc., where N is a current setting, N−1 is the last setting, N−2 is the setting previous to the last setting, and so on).

The processing circuitry 51' may detect motion by generating a sum of the absolute value of pixel differences, as will be appreciated by those skilled in the art. The pixel values used may be 8-bit pixel values after a digital zoom. Other pixel values types may be used. The sum of the pixel difference is compared to yet another threshold, for example, a 16-bit programmable threshold. The sum of the pixel differences is to be less than or equal to the programmable threshold for the finger to be considered not moving, stationary, or stable, If the finger is not stable, the processing circuitry 51' will again acquire initial data, for example, finger stability biometric data from a subset of the array (Block 134'), and thereafter determine whether the finger is stable (Block 136').

If the finger is stable (Block 136') or not moving relative to the array 31', the processing circuitry 51' determines an updated drive signal level based upon the initial data. In particular, an average setting for the DAC 46' is calculated, and a target DAC setting is determined (Block 138'). The average setting of the DAC 46' may be based upon successive acquisitions of initial data. The average DAC setting is compared to the target DAC setting (Block 140'). The difference between the average and target settings of the DAC 46' is used by the processing circuitry 51' to determine the updated drive signal level, and more particularly, to determine what drive signal or excitation level is desired to arrive at the target setting for the DAC (Block 142'). The processing circuitry 51' adjusts the drive signal level to the determined level (Block 144').

The regions, for example, as described above, are sampled and the average setting of the DAC 46' checked to see whether it is within a tolerance or threshold range of the target setting of the DAC (Block 146'). If, for example, the average setting of the DAC 46' is outside the threshold range of the target setting of the DAC, the drive signal level may again be updated (Block 138'). If the average setting of the DAC 46' is within the threshold range, the processing circuitry 51' acquires finger biometric data from the array of finger biometric sensing pixels 31' (Block 148') before ending at Block 150'.

As will be appreciated by those skilled in the art, the measurement signal path in the finger biometric sensor 50, a capacitive divider that may include a coating or dielectric layer over the sensor and pixel input capacitance, may cause fixed pattern noise based upon small differences in the coating or pixel input capacitance, for example. Of course, other or additional components of the finger biometric sensor 50 may cause fixed pattern noise. The apparent level of the fixed pattern noise generally varies with the level of the received signal. Since the signal level is also a function of finger type, the fixed pattern noise level can vary from finger to finger making it increasingly difficult for compensation.

By providing control of the drive signal level, the received carrier level may be changed to be within a relatively narrow range. Thus, fixed pattern noise, for example, may be maintained relatively constant and other or additional compensation therefore may be easier.

While a drive signal has been described herein, for example, with respect to driving a voltage into the user's finger 40, it will be appreciated that the drive signal may not limited to just driving the user's finger with the drive signal. In other words, the drive signal may be positive or negative relative to the user's finger 40, or a ground or circuit reference. For example, a drive signal may be managed by floating the ground of the amplifier in the first gain stage 60a', i.e., sense amplifier 63a', and connecting it to the drive signal. In some embodiments, the finger coupling electrode 47' may be coupled to a device ground so that the drive circuitry 44' drives the circuit reference with respect to the finger coupling electrode and the device ground. This arrangement may be known as the inverted drive system or floating ground system as will be appreciated by those skilled in the art. In other words, the drive signal level may be considered as an absolute value or magnitude, while in some embodiments, the sign of the drive signal may be positive or negative in the direction from the finger coupling electrode 47' to the array 31'.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A finger biometric sensor comprising:
   an array of finger biometric sensing pixels;
   a finger coupling electrode adjacent the array of finger biometric sensing pixels; and
   processing circuitry coupled to the array of finger biometric sensing pixels and the finger coupling electrode, and capable of
   coupling a drive signal to a finger via the finger coupling electrode when the finger is adjacent the array of finger biometric sensing pixels,
   acquiring initial data from the array of finger biometric sensing pixels based upon an initial drive signal level of the drive signal and with the finger positioned adjacent the array of finger biometric sensing pixels,
   determining an updated drive signal level of the drive signal based upon the initial data, and
   acquiring finger biometric data from the array of finger biometric sensing pixels based upon the updated drive signal level of the drive signal and with the finger positioned adjacent the array of finger biometric sensing pixels.

2. The finger biometric sensor of claim 1, wherein the processing circuitry is capable of generating a range of drive signal levels; and wherein the initial drive signal level is at a maximum of the range of drive signal levels.

3. The finger biometric sensor of claim 1, wherein the processing circuitry is capable of determining whether the finger is stable.

4. The finger biometric sensor of claim 3, wherein the processing circuitry is capable of determining the updated drive signal level when the finger is stable.

5. The finger biometric sensor of claim 1, wherein the processing circuitry comprises a digital-to-analog converter (DAC) and at least one gain stage coupled thereto.

6. The finger biometric sensor of claim 1, wherein the processing circuitry is capable of acquiring the initial data from a plurality of spaced-apart sub-arrays of the array of finger biometric sensing pixels.

7. The finger biometric sensor of claim 6, wherein the plurality of spaced apart sub-arrays are arranged in a checkerboard pattern.

8. The finger biometric sensor of claim 1, wherein the array of finger biometric sensing pixels comprises an array of electric field finger sensing pixels.

9. An electronic device comprising:
a housing;
wireless communications circuitry carried by the housing; and
a finger biometric sensor carried by the housing and comprising
an array of finger biometric sensing pixels,
a finger coupling electrode adjacent the array of finger biometric sensing pixels, and
processing circuitry coupled to the array of finger biometric sensing pixels and the finger coupling electrode, and capable of
coupling a drive signal to a finger via the finger coupling electrode when the finger is adjacent the array of finger biometric sensing pixels,
acquiring initial data from the array of finger biometric sensing pixels based upon an initial drive signal level of the drive signal and with the finger positioned adjacent the array of finger biometric sensing pixels,
determining an updated drive signal level of the drive signal based upon the initial data, and
acquiring finger biometric data from the array of finger biometric sensing pixels based upon the updated drive signal level of the drive signal and with the finger positioned adjacent the array of finger biometric sensing pixels.

10. The electronic device of claim 9, wherein the processing circuitry is capable of generating a range of drive signal levels; and wherein the initial drive signal level is at a maximum of the range of drive signal levels.

11. The electronic device of claim 9, wherein the processing circuitry is capable of determining whether the finger is stable.

12. The electronic device of claim 11, wherein the processing circuitry is capable of determining the updated drive signal level when the finger is stable.

13. The electronic device of claim 9, wherein the processing circuitry comprises a digital-to-analog converter (DAC) and at least one gain stage coupled thereto.

14. The electronic device of claim 9, wherein the processing circuitry is capable of acquiring the initial data from a plurality of spaced-apart sub-arrays of the array of finger biometric sensing pixels.

15. The electronic device of claim 9, wherein the array of finger biometric sensing pixels comprises an array of electric field finger sensing pixels.

16. The electronic device of claim 9, further comprising an input device carried by the housing; and wherein the finger biometric sensor is carried by the input device.

17. A method of acquiring finger biometric data comprising:
coupling a drive signal to a finger via the finger coupling electrode when the finger is adjacent an array of finger biometric sensing pixels,
acquiring initial data from the array of finger biometric sensing pixels based upon an initial drive signal level of the drive signal and with a finger positioned adjacent the array of finger biometric sensing pixels;
determining an updated drive signal level of the drive signal based upon the initial data; and
acquiring the finger biometric data from the array of finger biometric sensing pixels based upon the updated drive signal level of the drive signal and with the finger positioned adjacent the array of finger biometric sensing pixels.

18. The method of claim 17, wherein the initial drive signal level is at a maximum of a range of drive signal levels.

19. The method of claim 17, further comprising determining whether the finger is stable.

20. The method of claim 19, wherein the updated drive signal level is determined when the finger is stable.

21. The method of claim 17, wherein the initial data is acquired from a plurality of spaced-apart sub-arrays of the array of finger biometric sensing pixels.

* * * * *